(12) United States Patent
Hubmann (10) Patent No.: US 7,293,584 B1
(45) Date of Patent: Nov. 13, 2007

(54) FAUCET SPOUT AND DIVERTER VALVE

(75) Inventor: Curtis H. Hubmann, Racine, WI (US)

(73) Assignee: JohnsonDiversey, Inc., Sturtevant, WI (US)

( * ) Notice: Subject to any disclaimer, the term of this patent is extended or adjusted under 35 U.S.C. 154(b) by 0 days.

(21) Appl. No.: 11/449,943

(22) Filed: Jun. 8, 2006

Related U.S. Application Data (63) Continuation-in-part of application No. 11/385,359, filed on Mar. 21, 2006, now Pat. No. 7,152,626.

(51) Int. Cl.
*F16L 29/00* (2006.01)
(52) U.S. Cl. ............ 137/801; 137/614.02; 137/614.03; 251/149.1
(58) Field of Classification Search ........... 137/614.02, 137/614.03, 614.04, 614.05, 614.2, 801
See application file for complete search history.

(56) References Cited

U.S. PATENT DOCUMENTS

| | | | | |
|---|---|---|---|---|
| 5,143,346 | A | * | 9/1992 | Chen .......................... 137/801 |
| 5,560,548 | A | * | 10/1996 | Mueller et al. .......... 251/149.6 |
| 6,006,784 | A | * | 12/1999 | Tsutsui et al. .............. 137/801 |
| 6,997,181 | B2 | * | 2/2006 | Fletcher ................. 137/614.04 |

* cited by examiner

*Primary Examiner*—Kevin Lee
(74) *Attorney, Agent, or Firm*—Gregory S. Bollis (57) ABSTRACT

A combined faucet spout and diverter valve for attaching a dispensing system to a water source. In a first mode, water flows through the diverter valve to a first outlet which can be a faucet outlet. In a second mode, water is diverted to a fluid conduit which is fastened to a connecting member and a chemical dispenser. The connecting member provides movement of a shuttle valve which directs water in the second mode to the fluid conduit.

21 Claims, 6 Drawing Sheets

FAUCET SPOUT AND DIVERTER VALVE

CROSS-REFERENCE TO RELATED APPLICATIONS

This is a continuation-in-part of application Ser. No. 11/385,359 filed Mar. 21, 2006 now U.S. Pat. No. 7,152,626.

STATEMENT REGARDING FEDERALLY SPONSORED RESEARCH OR DEVELOPMENT

None.

BACKGROUND OF THE INVENTION

This invention relates generally to a device for connecting a dispenser to a water outlet. More particularly, it relates to a combined faucet spout and diverter valve for diverting water from a water outlet to the dispenser.

Diverter valves for connecting spray devices to a shower head are shown in U.S. Pat. No. 5,560,548 and U.S. Pat. No. 5,624,073. A diverter valve for connecting a spray device to a toilet is disclosed in U.S. Pat. No. 6,704,946. These devices are specifically designed for use with a shower head or a toilet. They do not lend themselves for use in conjunction with a faucet.

There is a need for a combined faucet and diverter valve which can be attached to a water outlet in a manner to provide a normal water flow from the faucet and alternatively afford a diversion of water from the faucet to a dispenser. There is also a need for a diverter valve for use with a faucet which affords a stable connection to a water outlet.

Accordingly, there is a need for an improved diverter valve for use with a water outlet.

The objects of the invention therefore are:

a. Providing an improved diverter valve.

b. Providing a combined faucet and diverter valve.

c. Providing a combined faucet and diverter valve of the foregoing type which is easily connected to a water outlet.

d. Providing a combined faucet and diverter valve of the foregoing type which includes a by-pass function.

e. Providing a combined faucet and diverter valve of the foregoing type which can be manufactured without special tooling and thus be cost effective.

SUMMARY OF THE INVENTION

The foregoing objects are accomplished and the shortcomings of the prior art are overcome by the combined faucet spout and diverter valve of this invention which include a valve housing having an annular cavity defined within said valve housing, a fluid inlet, a first fluid outlet, and a second fluid outlet. The annular cavity allows fluid communication between the fluid inlet, the first fluid outlet and the second fluid outlet. A shuttle valve is slidingly mounted in the annular cavity of the valve housing. There are means for constraining the shuttle valve within the cavity. The shuttle valve is constructed and arranged to be slideable within the annular cavity by water pressure to a first position in which said shuttle valve is seated adjacent said means for constraining said valve such that fluid flows between the fluid inlet and the first fluid outlet. The shuttle valve is slideable within the annular cavity to a second position in which said shuttle valve is positioned in the annular cavity of said valve housing such that fluid flows between the fluid inlet and the second fluid outlet. A faucet spout is connected to the first fluid outlet.

In a preferred embodiment, a valve member is positioned in the shuttle valve.

In another preferred embodiment, there is a biasing member positioned to close the shuttle valve and a valve opening member to open the shuttle valve.

In one aspect there is a third fluid outlet or bypass wherein the annular cavity allows fluid communication with the third outlet when the shuttle valve is in the second position.

In another aspect, a flow passage is constructed and arranged to permit the passage of water to the first fluid outlet at a slower rate than that when the shuttle valve is moved to the second position to permit the passage of water to the second fluid outlet.

In still another aspect, a flexible conduit is fastened to a connecting member opposite the connection to the valve housing and a chemical spray device is connected to the fluid conduit at an end opposite the connection to the connecting member.

In yet another aspect, the connecting member is a quick connect-disconnect member.

In another preferred embodiment, the first fluid outlet is in the form of a faucet outlet.

DESCRIPTION OF THE PREFERRED EMBODIMENT

Figure 1:
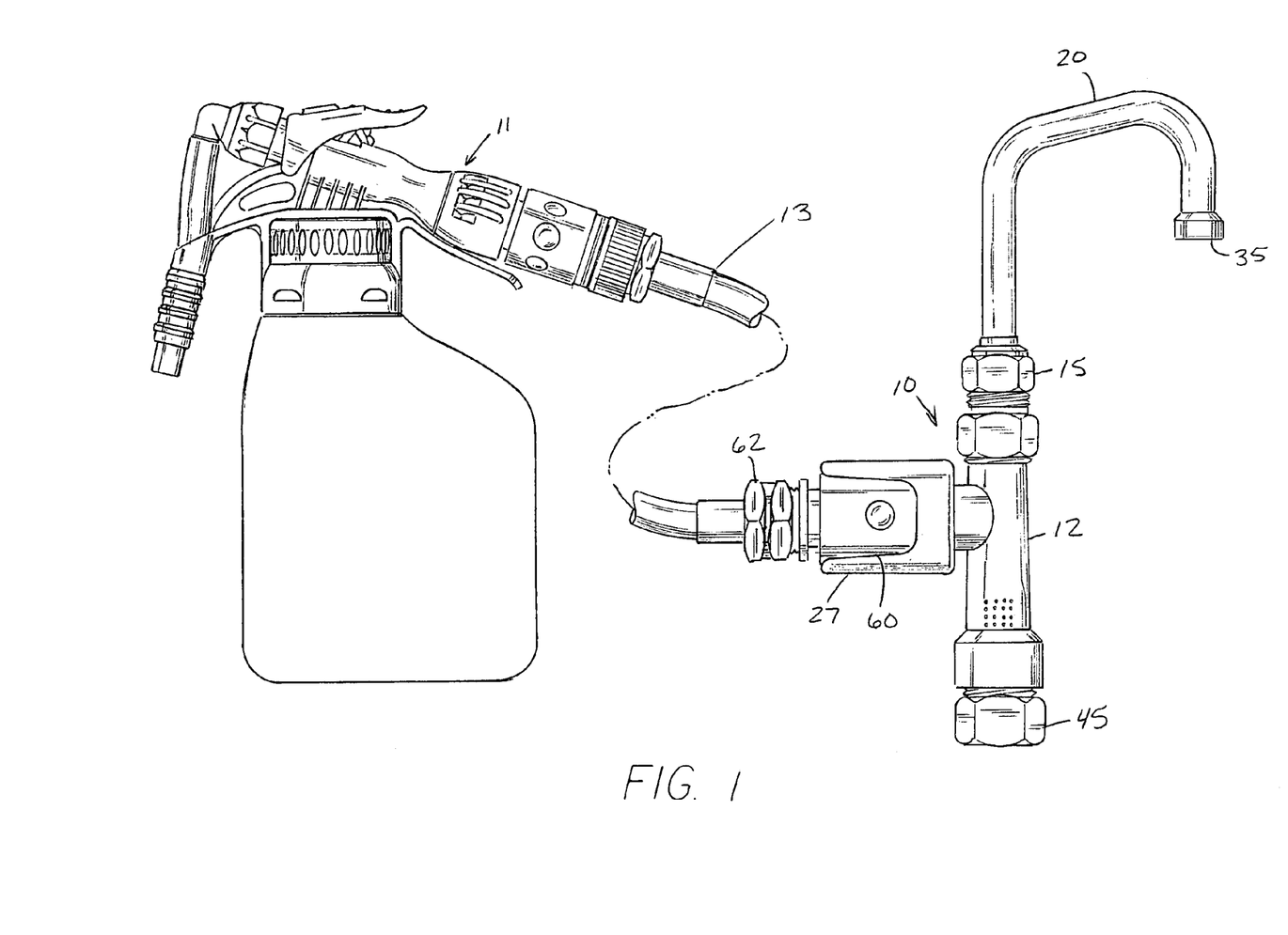
FIG. 1 is a side view showing the combined faucet spout and diverter valve in conjunction with a multifunction dispenser of FIG. 1.

Referring to FIG. 1, the combined faucet and diverter valve generally 10 is shown connected to a Multiple Function Dispenser generally 11 by the hose 13. This preferred dispenser is described in U.S. Pat. No. 6,708,901.

Figure 2:
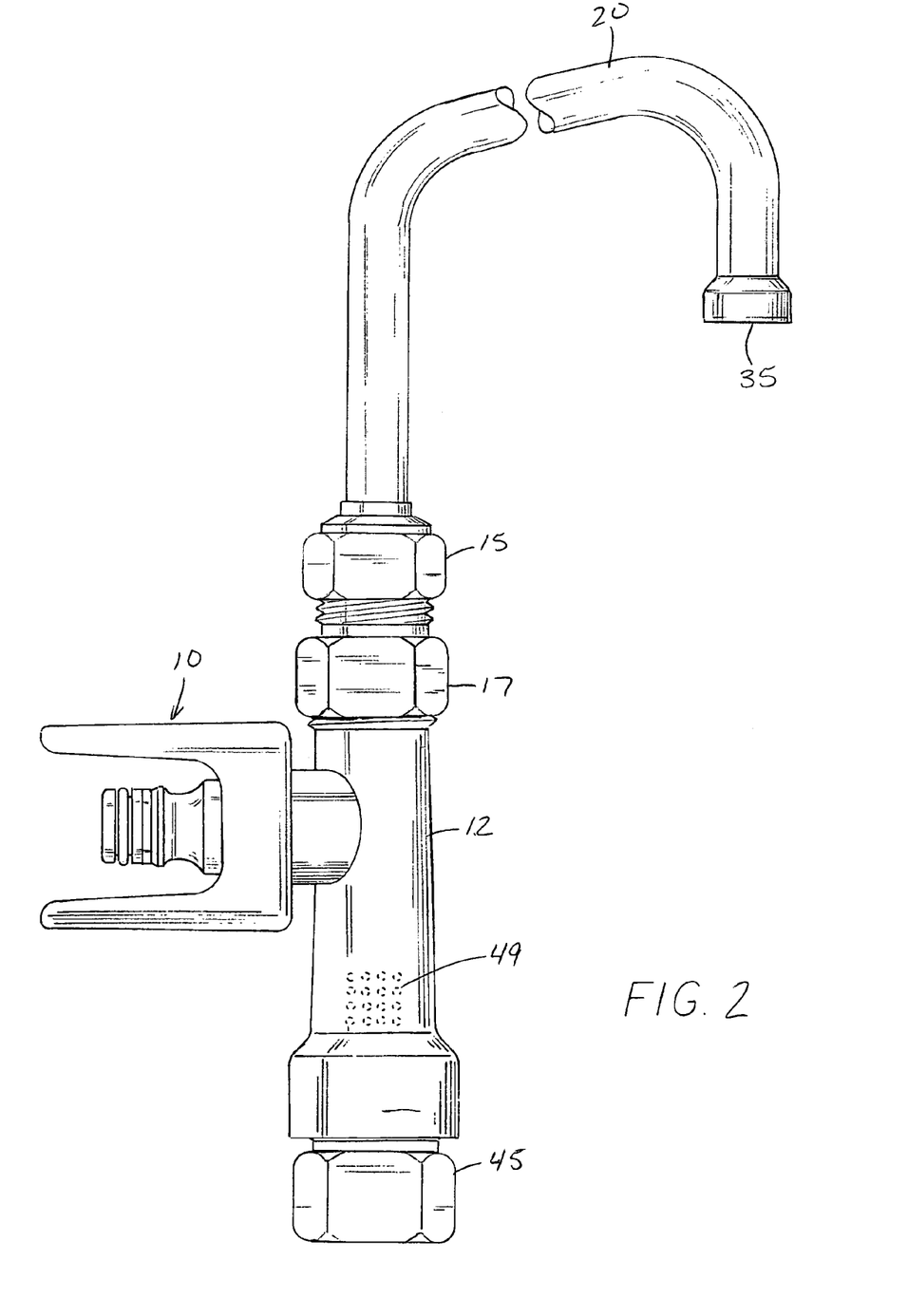
FIG. 2 is a side view showing the combined faucet spout and diverter valve of FIG. 1.
Figure 3:
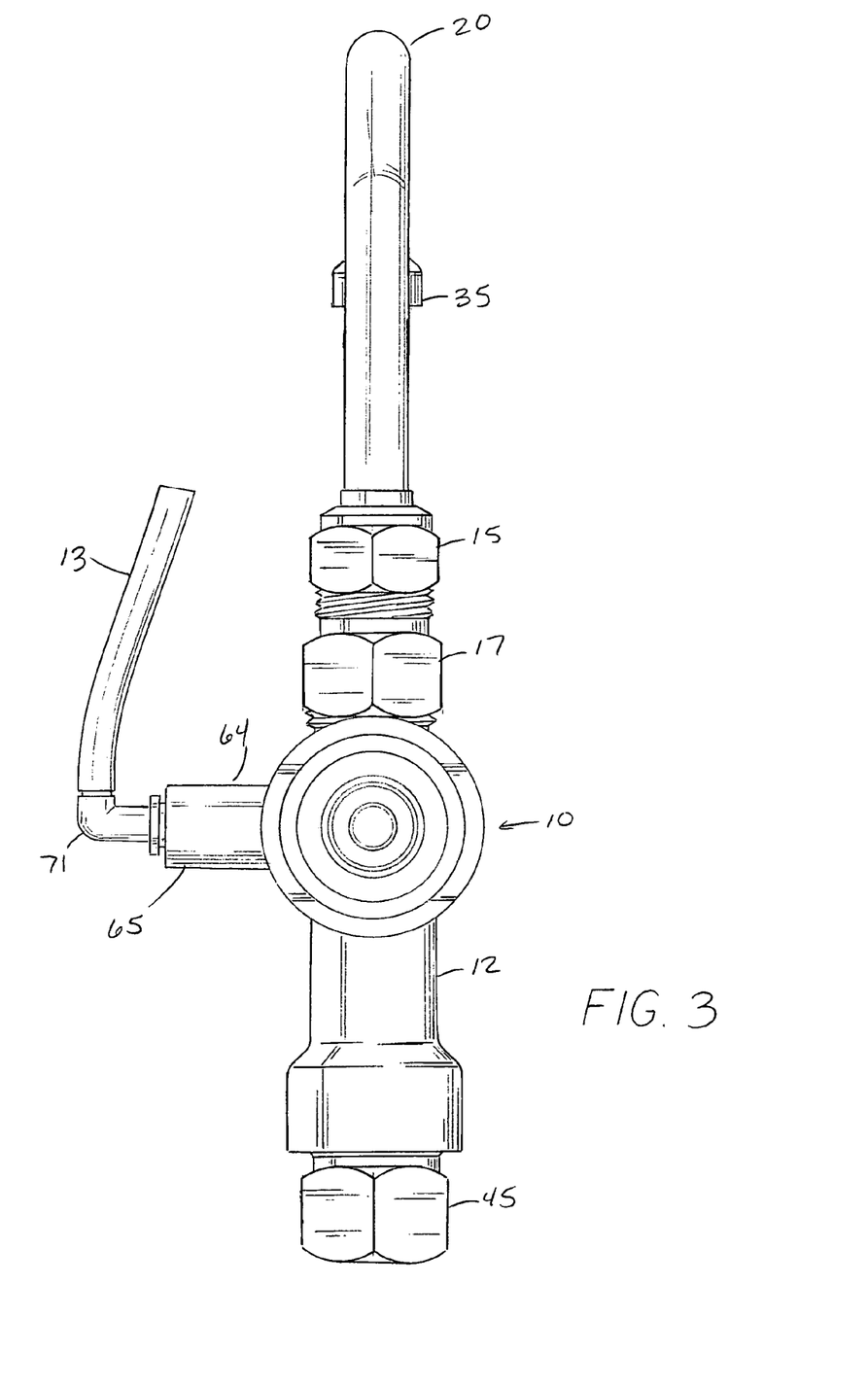
FIG. 3 is a view similar to FIG. 2 of the combined faucet and diverter valve rotated ninety degrees.

As shown in FIGS. 2-3, combined faucet and diverter valve 10 includes a valve housing 12 connected to a faucet 20 by means of threaded connectors 15 and 17. At the opposite end is another thread connector 45 for connecting the valve housing 12 to the usual valved plumbing fixture (not shown).

Figure 4:
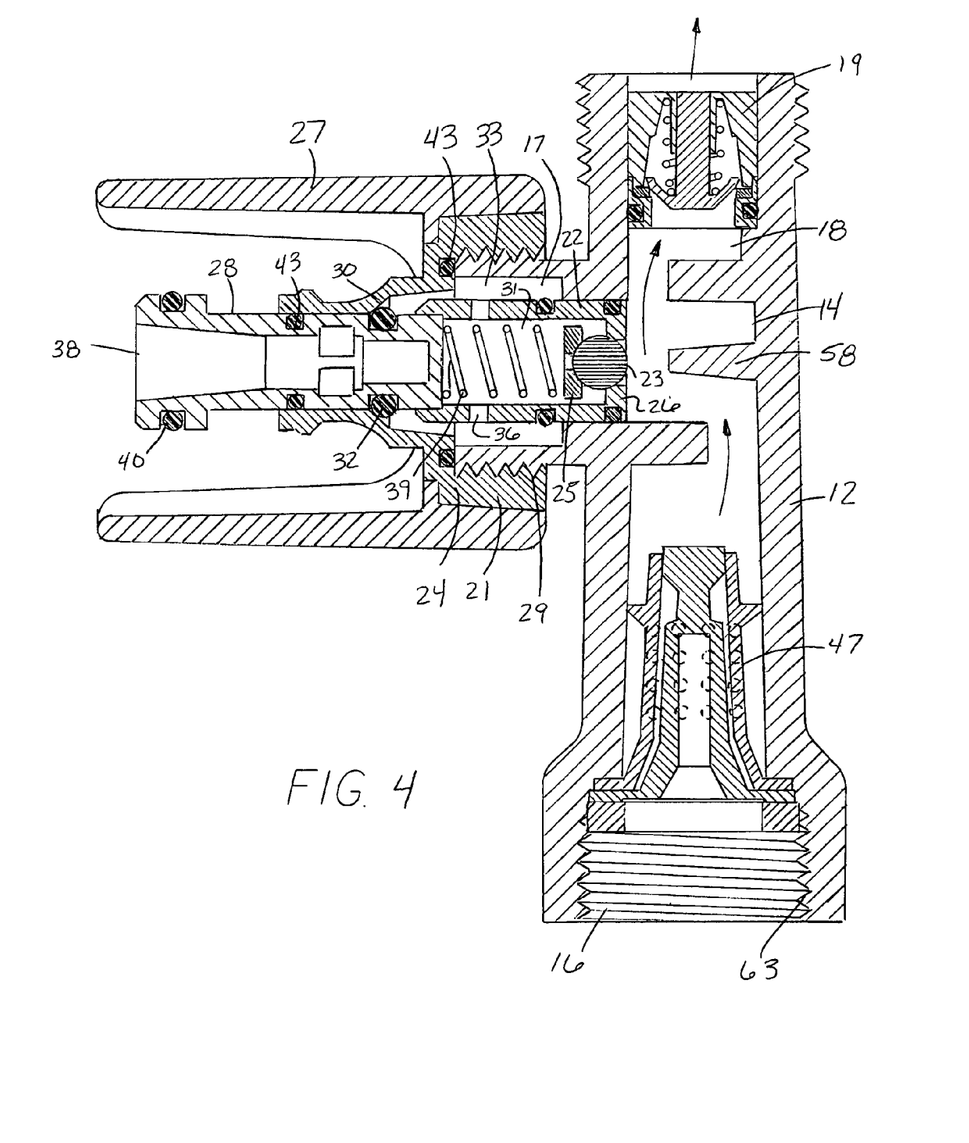
FIG. 4 is a cross section view of the diverter valve of the combined faucet and diverter valve in a non-diverting position.
Figure 5:
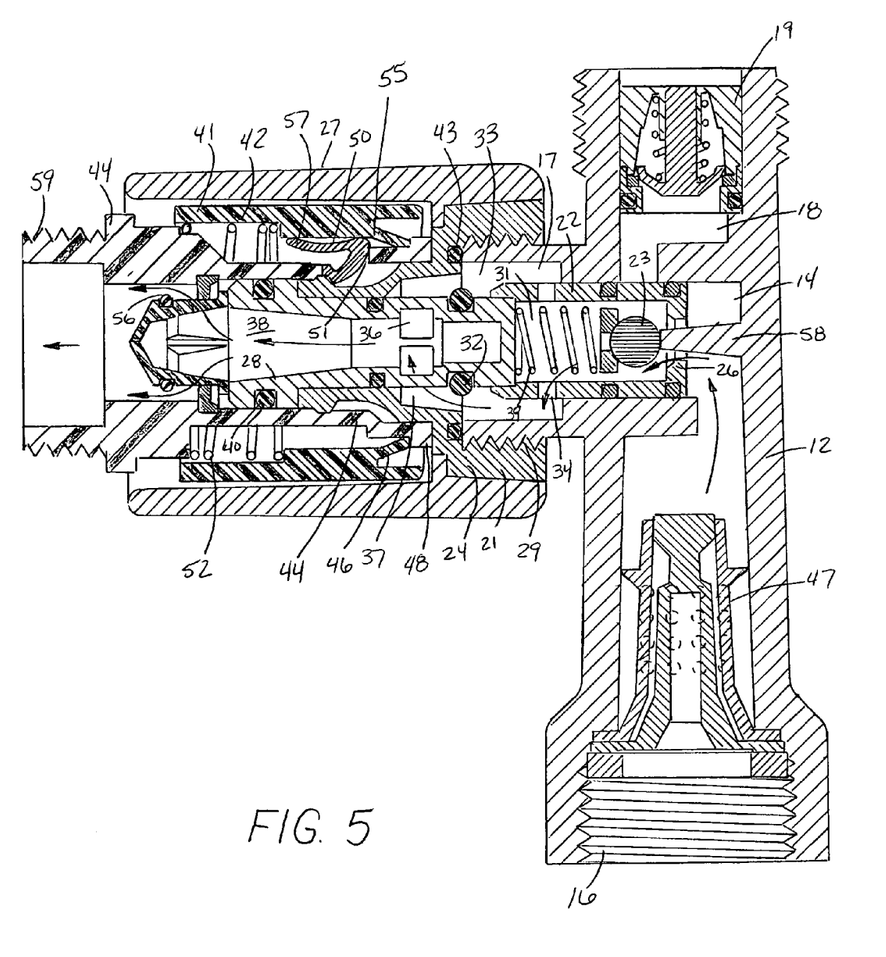
FIG. 5 is a view similar to FIG. 4 showing the diverter valve in a diverting position with a connecting member attached thereto.

Referring to FIGS. 4 and 5 valve housing 12 includes a first annular cavity 14 with a second annular cavity 17 connected thereto. A fluid inlet passage 16 is provided by the threaded opening 63 in fluid communication with annular cavity 14. There is a cavity 18 in fluid communication with annular cavity 14 which conveys fluid to faucet 20. A one-way valve 19 is located in cavity 18.

A pipe interrupter/backflow device 47 is positioned in cavity 14. There are the usual openings 49 in the valve housing 12 for this purpose. Slideably positioned in annular cavities 14 and 17 is a shuttle valve 22. A ball valve 23 is positioned in cavity portion 31 of shuttle valve 22. It is biased against valve seat 26 by spring 39 acting against retainer 25 and valve actuating member 28. Shuttle valve 22 is in contact with valve actuating member 28 having a seal 32 for contact with shoulder 30 in housing member 21. Additional seals 40 and 43 are also provided on actuating member 28.

A Gardena connecting device in the form of a quick connect-disconnect coupling part is shown in FIG. 5 at 41. It is readily available from Gardena Manufacturing GmbH. It comprises an outer sleeve 42 and an inner retaining collar 44 with an annulus portion 48 for retentive contact with tabs 46 extending from outer sleeve 42. There are locking elements 50 pivotally attached to retaining collar 44 and extending through apertures 51. A spring 52 biases the tabs 46 of outer sleeve 42 against the annulus portion 48. A one-way valve 54 is disposed in the central passageway 38 of the coupling part 41. A seal is provided at 56 as seen in FIG. 5.

Figure 6:
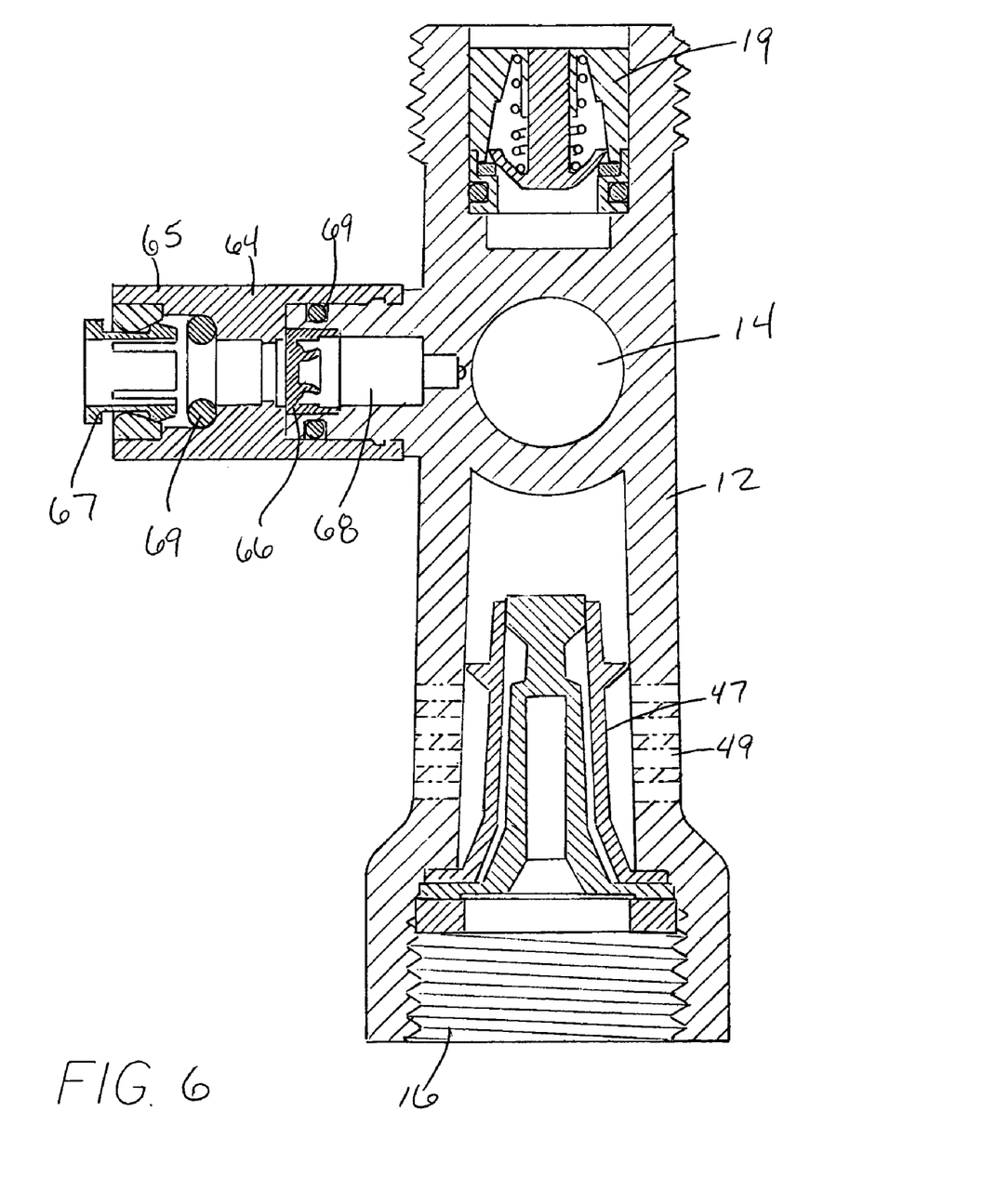
FIG. 6 is a cross-sectional view of the diverter valve showing a by-pass feature.

As described in FIG. 6, water bypass 64 with housing 65 is connected to valve housing 12. Housing 65 has a passageway 68 in fluid communication with cavity 14. A metering device 66 is positioned in passageway 68. This provides a flow rate of 0.1 gpm. It is available from Neoperl Inc. in Waterbury, Conn. A push in, pull to lock tube fitting 67 is also located in passageway 68. It seals swivel elbow 71, as seen in FIG. 3, to seal 69. Tube fitting is available from John Guest International Ltd. Located in Middlesex, England. There are seals shown at 69. The swivel elbow 71 is attached to housing 65 with a discharge tube 73 connected to elbow 71.

OPERATION

A better understanding of combined faucet and diverter valve 10 will be had by a description of its operation. Referring to FIGS. 1-4, combined faucet and diverter valve 10 is connected to a valved plumbing fixture (not shown) by means of threaded connector 45. Water flows into inlet 16, into cavity 14, into passage 18, through one-way valve 19 and out through faucet 20. This is shown by the directional arrows. Water pressure in cavity 14 acts against shuttle valve 22 to move it and activating member 28 to the position shown in FIG. 4.*** In this position, shuttle valve 22 is restrained from further movement by seal 32 engaging shoulder 30.

When it is desired to dispense product from dispenser 11 as seen in FIG. 1, the Gardena coupling part 41 is moved over actuating member 28 and a portion of housing member 21 until the Gardena coupling part 41 engages connecting member 24 of housing member 21. This is illustrated in FIG. 5. At the same time, flexible locking elements 50 engage the reduced diameter section 55 of housing member 21. The movement of locking elements 50 onto the reduced diameter section 55 is effected by the flange 57 moving against them. In this position, actuating member 28 contacts valve 54 to open it and moves shuttle valve 22 and moves shuttle valve to the position shown in FIG. 5. In this position, it is seen that shuttle valve 22 covers a portion of cavity 14 and blocks flow therethrough. At the same time projecting member 58 engages ball valve 23 to open it. This causes pressurized water to flow through into cavity portion 31. From there, water passes through orifice 34, into passage 33 between valve 22 and valve housing member 12, and into passage 37. From there it passes into orifices 36, into passage 38, through valve 54 and into hose 13 through coupling 62 which connects to threaded portion 59 of retaining collar 44. This is shown by the directional arrows.

When it is no longer desired to dispense product from dispenser 11, the Gardena coupling part 41 is grasped on opposing sides through slots such as 60 on slotted shield 27 and pulled in a direction away from valve housing 12. This is best seen in FIG. 1. This pulling action releases the contact of flange 57 with locking elements 50 and allows movement of the locking elements 50 out of the reduced diameter section 55 as well as the movement of shuttle valve away from cavity 14 and projecting member 58. This causes ball valve 23 to close and assume the position shown in FIG. 4. Water then flows through cavity 18 and aerator 35 as in its normal position. Aerator 35 causes a slower flow rate to faucet 20 when the combined faucet and diverter valve 10 is in a non-diverting position shown in FIG. 4, than when in the diverting position shown in FIG. 5. This small amount of back pressure caused by the aerator acts on valve 22 and assists in moving it to the non-diverting position.

Referring to FIG. 6, when the combined faucet and diverter valve 10 is in the diverting position, water will flow at a rate of 0.1 gpm through bypass 64. Flow is metered by valve 66. This feature is required by some plumbing codes to indicate that water is being diverted.

An important aspect of diverter valve 10 is the use of spring biased ball valve 23 and the projecting member 58 to open it. This affords closing the water flow out of passage 38 and not onto the user.

It will thus be seen there is now provided a combined faucet and diverter valve 10 which offers a quick-connect and disconnect with a water source. The combined faucet and diverter valve 10 is activated by coupling part which is readily available in the market place, thus reducing design and components costs. The combined faucet and dispenser valve 10 also provides a water bypass 64 which gives a visual and auditory indication that water is being diverted. In addition, this diverter valve 10 will allow users to attach many water powered devices without having a dedicated water source having a garden house thread. A diverter valve is placed between a faucet base and faucet arm thus providing backflow prevention, a connection point for a Gardena fitting, cross connection flow through and the ability to adapt to the three most popular North American faucets such as T&S, Fisher, and Chicago. When the water is turned on the combined faucet and diverter valve 10, it comes by default out of the normal faucet arm outlet. When a dispensing device is connected by means of the Gardena fitting, the water is then diverted to only the dispenser and the cross connection flow through. Once the dispenser 11 is disconnected, the water defaults back to the faucet arm 20. If one were to push in the valve actuating member 28 and turn on the water, the shuttle valve 22 automatically closes such that a leak is prevented. The back pressure of the aerator pushes shuttle valve 22 back to default position. This is assisted by the ball valve that wants to close outlet passage 38.

Another important aspect is in providing a combined faucet and diverter valve which obviates the need for a spring. This reduces maintenance costs due to faulty springs.

The preferred material for composing valve housing 12 and shuttle valve 22 is glass filled polypropylene. However, other plastic materials and metals can be employed. For example, acetyls and polycarbonates, as well as brass and aluminum.

The combined faucet and diverter valve 10 has been described for use with a particular Gardena connect-disconnect coupling part 41. It will be appreciated any such coupling part could be employed which provides movement of the actuating member 28 of the shuttle valve 22. Neither is it essential that the combined faucet and diverter valve 10 be employed with a particular dispenser 11. It can be utilized in conjunction with any liquid dispensing device or apparatus. Slotted shield 27 could be eliminated. However, it does reduce accidental contact with actuating member 28 when extended from housing member 21. A bypass 64 has been described to show water diversion. This is not an essential component and could be eliminated. All such and other modifications within the spirit of the invention are meant to be within its scope as defined by the appended claims.

What is claimed is:

1. A combined faucet spout and diverter valve comprising:
   a. a valve housing having an annular cavity defined within said valve housing, a fluid inlet, a first fluid outlet, and a second fluid outlet, wherein the annular cavity allows fluid communication between the fluid inlet, the first fluid outlet and the second fluid outlet;
   b. a shuttle valve slidingly mounted in the annular cavity of said valve housing;
   c. means for constraining said shuttle valve within said cavity;
   d. said shuttle valve constructed and arranged to be slideable within the annular cavity by water pressure to a first position in which said shuttle valve is seated adjacent said means for constraining said valve such that fluid flows between the fluid inlet and the first fluid outlet;
   e. said shuttle valve is slideable within the annular cavity to a second position in which said shuttle valve is positioned in the annular cavity of said valve housing such that fluid flows between the fluid inlet and the second fluid outlet; and
   f. a faucet spout connected to the first fluid outlet.

2. The combined faucet spout and diverter valve as defined in claim 1 further including a biased valve member positioned in the shuttle valve.

3. The combined faucet spout and diverter valve as defined in claim 1 including a flow passage constructed and arranged to permit the passage of water to the first fluid outlet at a slower rate than that when the shuttle valve is moved to the second position to permit the passage of water to the second fluid outlet.

4. The combined faucet spout and diverter valve as defined in claim 1 further including a connecting member constructed and arranged to be connected to the valve housing and to move the shuttle valve to the second position.

5. The combined faucet spout and diverter valve as defined in claim 4 wherein the connecting member includes an actuating member to move the valve to the second position.

6. The combined faucet spout and diverter valve as defined in claim 4 wherein the connecting member is constructed and arranged to provide a push connection and a pull disconnection.

7. The combined faucet spout and diverter valve as defined in claim 6 wherein the connecting member includes a one-way valve.

8. The combined faucet spout and diverter valve as defined in claim 7 wherein the one-way valve is opened by a shuttle valve actuating member.

9. The combined faucet spout and diverter valve as defined in claim 6 further including a flexible conduit member fastened to the connecting member opposite the connection to the valve housing.

10. The combined faucet spout and diverter valve as defined in claim 9 further including a chemical spray device connected to the fluid conduit at an end opposite the connection to the connecting member.

11. The combined faucet spout and diverter valve as defined in claim 10 wherein the connecting member is a hollow stem member.

12. The combined faucet spout and diverter valve of claim 1 further including:
   a third fluid outlet, wherein the annular cavity allows fluid communication with the third fluid outlet when the shuttle valve is in the first and second potions.

13. A diverter valve for attaching a dispensing system to a water source, said diverter valve comprising:
   a. a valve housing having an annular cavity defined within said valve housing, a fluid inlet, a first fluid outlet, and a second fluid outlet, wherein the annular cavity allows fluid communication between the fluid inlet, the first fluid outlet and the second fluid outlet;
   b. a shuttle valve slidingly mounted in the annular cavity of said valve housing;
   c. means for constraining said shuttle valve within said cavity;
   d. said shuttle valve constructed and arranged to be slideable within the annular cavity by water pressure to a first position in which said shuttle valve is seated adjacent said means for constraining said valve such that fluid flows between the fluid inlet and the first fluid outlet;
   e. said shuttle valve is slideable within the annular cavity to a second position in which said shuttle valve is positioned in the annular cavity of said valve housing such that fluid flows between the fluid inlet and the second fluid outlet;
   f. a one-way valve member positioned in the shuttle valve;
   g. a biasing member positioned to close the one-way valve member; and
   h. a valve opening member constructed and arranged to open the one-way valve when the shuttle valve is in the second position.

14. The diverter valve as defined in claim 13 wherein the valve opening member is a projecting member.

15. A diverter valve for connection to a faucet spout comprising:
   a. a valve housing having an annular cavity defined within said valve housing, a fluid inlet, a first fluid outlet, and a second fluid outlet, wherein the annular cavity allows fluid communication between the fluid inlet, the first fluid outlet and the second fluid outlet, the valve housing including a connection to a faucet spout;
   b. a shuttle valve slidingly mounted in the annular cavity of said valve housing;
   c. means for constraining said shuttle valve within said cavity;
   d. said shuttle valve constructed and arranged to be slideable within the annular cavity by water pressure to a first position in which said shuttle valve is seated adjacent said means for constraining said valve such that fluid flows between the fluid inlet and the first fluid outlet; and
   e. said shuttle valve is slideable within the annular cavity to a second position in which said shuttle valve is positioned in the annular cavity of said valve housing such that fluid flows between the fluid inlet and the second fluid outlet.

16. The combined faucet spout and diverter valve as defined in claim 15 further including a third fluid outlet wherein the annular cavity allows fluid communication with the third outlet when the shuttle valve is in the first and second positions.

17. The combined faucet spout and diverter valve as defined in claim 15 further including a pipe interrupter in the valve housing in fluid communication with the fluid inlet.

18. The combined faucet spout and diverter valve as defined in claim 15 further including a one-way valve positioned in the first fluid outlet.

19. The combined faucet spout and diverter valve as defined in claim 15 further including a connecting member constructed and arranged to be connected to the valve housing to move the shuttle valve to the second position.

20. The combined faucet spout and diverter valve as defined in claim 19 wherein the connecting member is constructed and arranged to be fastened to a flexible conduit member.

21. The combined faucet spout and diverter valve as defined in claim 20 wherein the flexible conduit member is connected to a chemical spray device.

* * * * *